(12) United States Patent
Yoshida et al.

(10) Patent No.: US 11,749,021 B2
(45) Date of Patent: Sep. 5, 2023

(54) RETRIEVAL DEVICE, CONTROL METHOD, AND NON-TRANSITORY STORAGE MEDIUM

(71) Applicant: NEC Corporation, Tokyo (JP)

(72) Inventors: Satoshi Yoshida, Tokyo (JP); Jianquan Liu, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/610,200

(22) PCT Filed: May 8, 2020

(86) PCT No.: PCT/JP2020/018704
§ 371 (c)(1),
(2) Date: Nov. 10, 2021

(87) PCT Pub. No.: WO2020/241208
PCT Pub. Date: Dec. 3, 2020

(65) Prior Publication Data
US 2022/0222967 A1    Jul. 14, 2022

(30) Foreign Application Priority Data
May 27, 2019  (JP) ................ 2019-098793

(51) Int. Cl.
*G06V 40/10*  (2022.01)
*G06V 40/16*  (2022.01)
(Continued)

(52) U.S. Cl.
CPC .......... *G06V 40/171* (2022.01); *G06V 10/761* (2022.01); *G06V 10/771* (2022.01); *G06V 10/7715* (2022.01)

(58) Field of Classification Search
CPC .............. G06V 40/171; G06V 10/761; G06V 10/771; G06V 10/7715; G06V 40/172; G06F 16/532
See application file for complete search history.

(56) References Cited

U.S. PATENT DOCUMENTS

2009/0060294 A1* 3/2009 Matsubara ............ G06F 16/532
                                                                  382/118
2009/0110293 A1* 4/2009 Iwasaki ................. G06F 18/21
                                                                  382/209
(Continued)

FOREIGN PATENT DOCUMENTS

JP    2008-250693 A    10/2008
JP    2013-101431 A     5/2013
(Continued)

OTHER PUBLICATIONS

International Search Report for PCT Application No. PCT/JP2020/018704, dated Jun. 16, 2020.
(Continued)

*Primary Examiner* — Md K Talukder
(74) *Attorney, Agent, or Firm* — Sughrue Mion, PLLC (57) ABSTRACT

A retrieval apparatus (2000) is accessible to a storage region (50) in which a plurality of pieces of object information (100) are stored. The object information (100) includes a feature value set (104) being a set of a plurality of feature values acquired regarding an object. The retrieval apparatus (2000) acquires a feature value set (retrieval target set (60)) being a retrieval target, and determines the object information (100) having the feature value set (104) similar to the retrieval target set (60) by comparing the retrieval target set (60) with the feature value set (104). Herein, in a case where a feature value set satisfies a predetermined condition, the retrieval apparatus (2000) performs comparison between the feature value set and another feature value set by using a part (Continued)

of feature values within the feature value set. Further, the retrieval apparatus (2000) outputs output information relating to the determined object information (100).

8 Claims, 4 Drawing Sheets

(51) Int. Cl.
*G06V 10/771* (2022.01)
*G06V 10/77* (2022.01)
*G06V 10/74* (2022.01)

(56) References Cited

U.S. PATENT DOCUMENTS

| | | | |
|---|---|---|---|
| 2010/0177206 A1* | 7/2010 | Ogawa | G06V 40/169 348/222.1 |
| 2013/0121590 A1 | 5/2013 | Yamanaka et al. | |
| 2016/0299920 A1* | 10/2016 | Feng | G06F 16/70 |
| 2018/0373737 A1* | 12/2018 | Watanabe | G06V 20/40 |
| 2022/0207649 A1* | 6/2022 | Lu | G06V 10/32 |
| 2022/0222967 A1* | 7/2022 | Yoshida | G06V 10/7715 |

FOREIGN PATENT DOCUMENTS

| | | | | |
|---|---|---|---|---|
| JP | 2013-122755 A | | 6/2013 | |
| JP | 2016-075992 A | | 5/2016 | |
| JP | 2017-204095 A | | 11/2017 | |
| JP | 2018-147435 A | | 9/2018 | |
| KR | 101370042 B1 | * | 10/2012 | G11B 27/19 |
| KR | 10-1370042 B1 | | 3/2014 | |

OTHER PUBLICATIONS

JP Office Action for JP Application No. 2021-522165, dated Mar. 7, 2023 with English Translation.
Decision to Grant a Patent corresponding to Japanese Patent Application 2021-522165 dated Jul. 11, 2023.

* cited by examiner

RETRIEVAL DEVICE, CONTROL METHOD, AND NON-TRANSITORY STORAGE MEDIUM

This application is a National Stage Entry of PCT/JP2020/018704 filed on May 8, 2020, which claims priority from Japanese Patent Application 2019-098793 filed on May 27, 2019, the contents of all of which are incorporated herein by reference, in their entirety.

TECHNICAL FIELD

The present invention relates to data retrieval.

BACKGROUND ART

Various techniques for facilitating data retrieval have been developed. In data retrieval, determination of associated data is performed by performing comparison between registered data, and a condition (e.g., a value of a part of data) specified by a retrieval query.

Herein, a set may be handled as data being a retrieval target. Patent Document 1 is cited as a document that discloses a technique relating to comparison between data sets. Patent Document 1 computes dissimilarity between image sample sequences, based on a ratio between a probability density of a feature value to be extracted from an image sample sequence located preceding a key frame within a moving image, and a probability density of a feature value to be extracted from an image sample sequence located succeeding the key frame, and determines whether a predetermined event occurs within the key frame, based on the computed dissimilarity.

RELATED DOCUMENT

Patent Document

[Patent document 1] Japanese Patent Application Publication No. 2013-122755

SUMMARY OF INVENTION

Technical Problem

The inventors of the present application found a new technique for shortening a time required for data retrieval, in a case where a data set is handled as a retrieval target. Patent Document 1 is a document that discloses a technique for detecting occurrence of an event from a moving image, and does not mention data retrieval.

The present invention has been made in view of the above problem, and one of objects of the present invention is to provide a technique for shortening a time required for retrieval of a data set.

Solution to Problem

A retrieval apparatus according to the present invention is accessible to a storage region in which a plurality of pieces of object information including a feature value set being a set of a plurality of feature values acquired regarding an object are stored.

The retrieval apparatus includes: 1) a determination unit that acquires a feature value set being a retrieval target, and determines object information indicating a feature value set similar to a feature value set being the retrieval target from among the plurality of pieces of object information by comparing the acquired feature value set with a feature value set indicated in the object information; and 2) an output unit that outputs output information relating to the determined object information.

In a case where the feature value set satisfies a predetermined condition, the determination unit performs comparison between the feature value set and another feature value set by using a part of feature values within the feature value set.

A control method according to the present invention is executed by a computer. The computer is accessible to a storage region in which a plurality of pieces of object information including a feature value set being a set of a plurality of feature values acquired regarding an object are stored.

The control method includes 1) a determination step of acquiring a feature value set being a retrieval target, and determining object information indicating a feature value set similar to a feature value set being the retrieval target from among the plurality of pieces of object information by comparing the acquired feature value set with a feature value set indicated in the object information; and 2) an output step of outputting output information relating to the determined object information.

The determination step further includes, in a case where the feature value set satisfies a predetermined condition, performing comparison between the feature value set and another feature value set by using a part of feature values within the feature value set.

A program according to the present invention causes a computer to execute each of the steps included in the control method according to the present invention.

Advantageous Effects of Invention

The present invention provides a technique for shortening a time required for retrieval of a data set.

DESCRIPTION OF EMBODIMENTS

Hereinafter, example embodiments according to the present invention are described with reference to the drawings. Note that, in all the drawings, a similar constituent element has a similar reference sign, and description thereof is omitted as necessary. In each of the block diagrams, unless otherwise specifically described, each block does not represent a configuration of a hardware unit, but represents a configuration of a functional unit.

Example Embodiment 1

<Overview>

Figure 1:
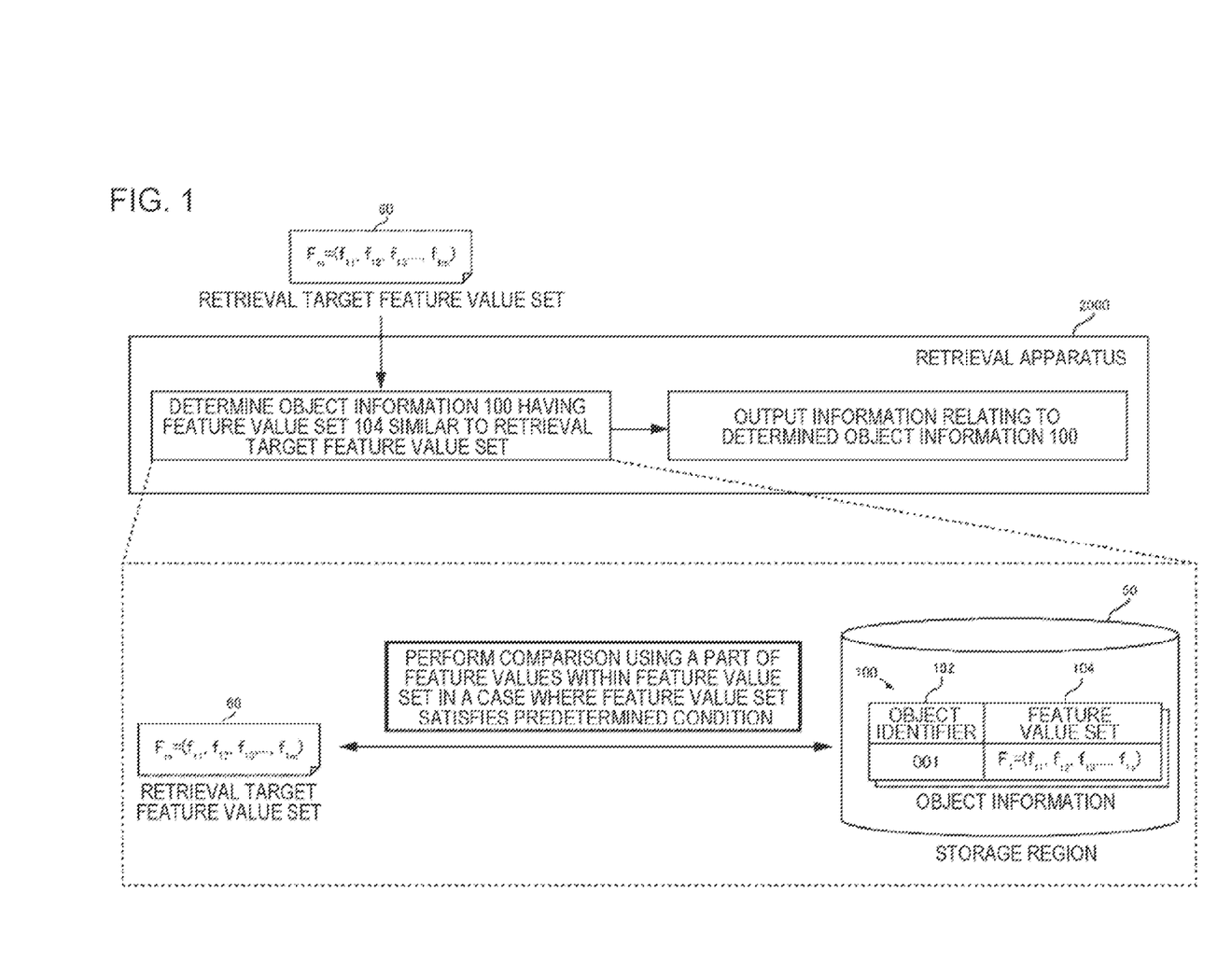
FIG. 1 is a diagram for describing an overview of a retrieval apparatus according to a present example embodiment.

FIG. 1 is a diagram for describing an overview of a retrieval apparatus 2000 according to a present example embodiment. Note that, FIG. 1 is an example for facilitating understanding of the retrieval apparatus 2000, and a function of the retrieval apparatus 2000 is not limited to the one illustrated in FIG. 1.

The retrieval apparatus 2000 performs retrieval of information stored in a storage region 50. The storage region 50 is a storage region of a part or the entirety of any storage apparatus. Further, the storage region 50 may be constituted of a plurality of storage apparatuses.

Object information 100 is stored in the storage region 50. The object information 100 is information in which an object identifier 102 and a feature value set 104 are associated with each other. The object identifier 102 is an identifier allocated to an object. The feature value set 104 is a set of feature values acquired regarding an object to be determined by the associated object identifier 102. For example, a feature value is an image feature of an object to be acquired from an image. Note that, any object (e.g., a person, an animal, a vehicle, or the like) can be handled as an object.

The retrieval apparatus 2000 acquires a feature value set (retrieval target set 60) being a retrieval target, and retrieves object information 100 by the retrieval target set 60. In other words, the retrieval apparatus 2000 determines object information 100 indicating a feature value set 104 similar to the retrieval target set 60 from among a plurality of pieces of object information 100 by comparison of the retrieval target set 60 with the feature value set 104.

Herein, in a case where a feature value set satisfies a predetermined condition, the retrieval apparatus 2000 performs comparison with another feature value set by using a part of feature values within the feature value set. For example, the predetermined condition is that the number of elements in a feature value set is equal to or more than a predetermined number.

Further, the retrieval apparatus 2000 outputs output information relating to the determined object information 100. For example, output information is the determined object information 100 itself. In addition to the above, for example, output information may be an object identifier 102 indicated by the determined object information 100, or the like.

<Representative Advantageous Effects>

In the retrieval apparatus 2000 according to the present example embodiment, object information 100 having a feature value set 104 similar to a retrieval target set 60 is determined by comparison between the retrieval target set 60 and the feature value set 104. Thus, for example, it is possible to determine, from among object information 100, object information 100 having a feature value set 104 being estimated to be constituted of a feature value of a same object, regarding an object represented by a feature value included in a retrieval target set 60.

For example, object information 100 is generated in advance regarding various persons, and registered in the storage region 50. In this case, for example, a feature value set 104 is a set of image features of an associated person. In other words, the storage region 50 can be handled as a database in which image features of various persons are collected. Then, for example, a set of image features of a person being newly acquired from a video of a surveillance camera is used as a retrieval target set 60. Thus, it is possible to determine a person corresponding to a person captured by the surveillance camera from among the persons registered in advance. Specifically, it is possible to achieve various pieces of processing such as authentication of a person, matching with a blacklist, and the like.

As described above, herein, in a case where a feature value set satisfies a predetermined condition, the retrieval apparatus 2000 performs comparison with another feature value set by using a part of feature values within the feature value set. This enables reducing a time required for comparison between feature value sets. For example, it is assumed that the predetermined condition is that "the number of elements in a feature value set is equal to or more than a predetermined number". In this case, by setting, as a predetermined number, a number sufficient for comparison between feature value sets, it is possible to shorten a time required for comparison between feature values, while performing comparison between feature value sets with high accuracy.

Hereinafter, further details of the present example embodiment are descried.

<Example of Functional Configuration>

Figure 2:
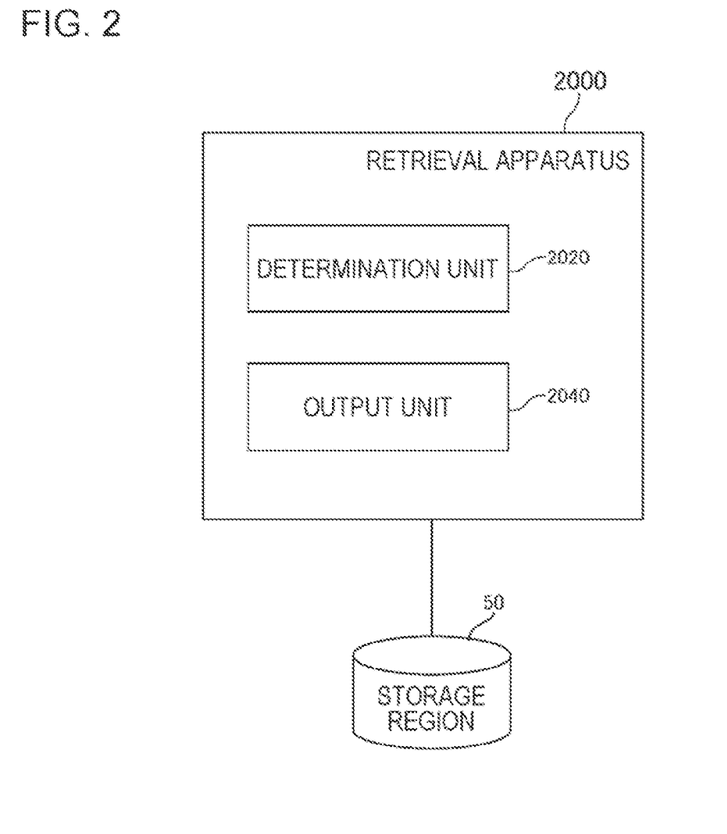
FIG. 2 is a diagram illustrating a functional configuration of a retrieval apparatus according to an example embodiment 1.

FIG. 2 is a diagram illustrating a functional configuration of the retrieval apparatus 2000 according to an example embodiment 1. The retrieval apparatus 2000 includes a determination unit 2020 and an output unit 2040. The retrieval apparatus 2000 is configured to be accessible to the storage region 50. The determination unit 2020 acquires a retrieval target set 60, and determines object information 100 indicating a feature value set 104 similar to the retrieval target set 60 from among a plurality of pieces of object information 100 by performing comparison between the retrieval target set 60 and the feature value set 104. The output unit 2040 outputs output information relating to the determined object information 100.

<Example of Hardware Configuration of Retrieval Apparatus 2000>

Each functional configuration unit of the retrieval apparatus 2000 may be achieved by hardware that achieves each functional configuration unit (example: a hard-wired electronic circuit, and the like), or may be achieved by combination of hardware and software (example: combination of an electronic circuit and a program that controls the electronic circuit, and the like). Hereinafter, a case is further described in which each functional configuration unit of the retrieval apparatus 2000 is achieved by combination of hardware and software.

Figure 3:
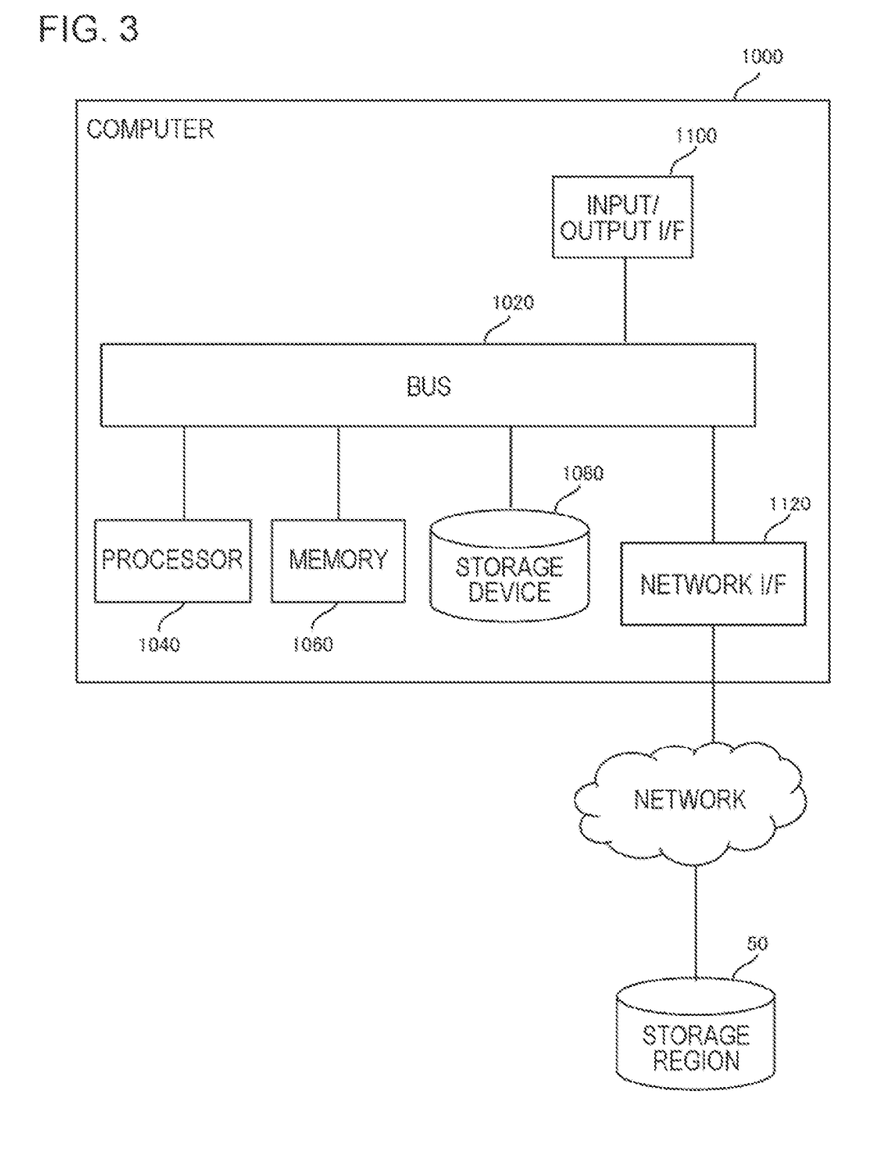
FIG. 3 is a diagram illustrating a computer for achieving the retrieval apparatus.

FIG. 3 is a diagram illustrating a computer 1000 for achieving the retrieval apparatus 2000. The computer 1000 is any computer. For example, the computer 1000 is any computer. For example, the computer 1000 is a stationary type computer such as a server machine and a personal computer (PC). In addition to the above, for example, the computer 1000 may be a portable computer such as a smartphone and a tablet terminal.

The computer 1000 may be a dedicated computer designed for achieving the retrieval apparatus 2000, or may be a general-purpose computer. In a case where the computer 1000 is a general-purpose computer, it is appropriate to cause the computer 1000 to function as the retrieval apparatus 2000 by installing a predetermined program in the computer 1000.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection.

The processor 1040 is a variety of processors such as a central processing unit (CPU), a graphics processing unit (GPU), and a field-programmable gate array (FPGA). The memory 1060 is a main storage apparatus to be achieved by using a random access memory (RAM) or the like. The storage device 1080 is an auxiliary storage apparatus to be achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard, and an output apparatus such as a display apparatus are connected to the input/output interface 1100.

The network interface 1120 is an interface for connecting the computer 1000 to a network. A method of connecting the network interface 1120 to a network may be wireless connection or may be wired connection.

The computer 1000 is connected to the storage region 50 via the network interface 1120. However, a method of connecting the computer 1000 to the storage region 50 is not limited to a method via the network interface 1120. For example, the storage region 50 may be connected to the computer 1000 via the input/output interface 1100. Further, the storage region 50 may be provided inside the computer 1000 (e.g., inside the storage device 1080).

The storage device 1080 stores a program module that achieves each functional configuration unit of the retrieval apparatus 2000. The processor 1040 achieves a function associated with each program module by reading each of these program modules in the memory 1060 and executing each of these program modules.

<Flow of Processing>

Figure 4:
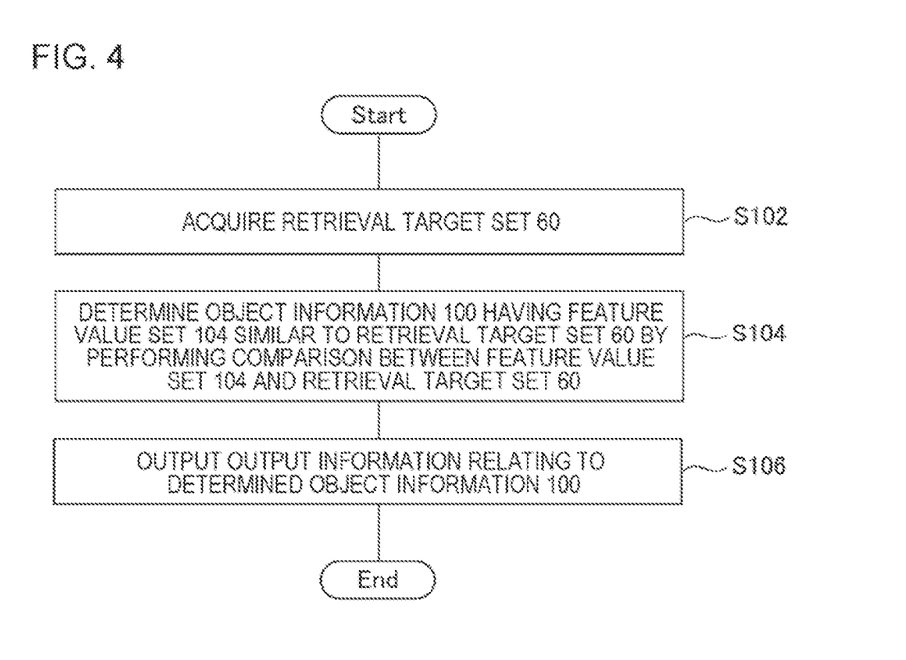
FIG. 4 is a flowchart illustrating a flow of processing to be executed by the retrieval apparatus according to the example embodiment 1.

FIG. 4 is a flowchart illustrating a flow of processing to be executed by the retrieval apparatus 2000 according to the example embodiment 1. The determination unit 2020 acquires a retrieval target set 60 (S102). The determination unit 2020 determines object information 100 having a feature value set 104 similar to the retrieval target set 60 by performing comparison between the feature value set 104 and the retrieval target set 60 (S104). The output unit 2040 outputs output information relating to the determined object information 100 (S106).

<Acquisition of Retrieval Target Set 60: S102>

The determination unit 2020 acquires a retrieval target set 60 (S102). A method of acquiring a retrieval target set 60 by the determination unit 2020 is optional. For example, the retrieval apparatus 2000 transmits the retrieval target set 60 transmitted from another apparatus. For example, the "another apparatus" is a PC, a mobile terminal, or the like (hereinafter, a user terminal) operated by a user of the retrieval apparatus 2000. However, an apparatus that transmits the retrieval target set 60 to the retrieval apparatus 2000 is not limited to a user terminal, but can be any terminal. For example, the retrieval target set 60 may be automatically transmitted to the retrieval apparatus 2000 from an apparatus on which an application for handling a feature value set is operated, as part of processing of the application.

<Comparison Between Feature Value Set 104 and Retrieval Target Set 60: S104>

The determination unit 2020 determines object information 100 having a feature value set 104 similar to the retrieval target set 60 by performing comparison between the retrieval target set 60 and the feature value set 104, and determining the feature value set 104 similar to the retrieval target set 60 (S104). For example, the determination unit 2020 computes similarity between the retrieval target set 60 and the feature value set 104, and determines the feature value set 104 whose similarity is equal to or more than a predetermined value. Then, the determination unit 2020 determines, as object information 100 having the feature value set 104 similar to the retrieval target set 60, object information 100 having the determined feature value set 104.

Note that, in a case where there are a plurality of feature value sets 104 whose similarity to the retrieval target set 60 is equal to or more than a predetermined value, the determination unit 2020 may determine, as a feature value set 104 similar to the retrieval target set 60, all these plurality of feature value sets 104, or may determine only a feature value set 104 whose similarity is largest among all the feature value sets 104. In a case where there is no feature value set 104 whose computed similarity is equal to or more than a predetermined value, object information 100 having the feature value set 104 similar to the retrieval target set 60 is not determined.

Hereinafter, a method of computing similarity between a retrieval target set 60 and a feature value set 104 is described. For example, the determination unit 2020 computes similarity regarding each of all patterns of a pair to be acquired by extracting a feature value one by one from the retrieval target set 60 and the feature value set 104, and handles, as similarity between the retrieval target set 60 and the feature value set 104, a statistical value (such as an average value) of the computed similarity. It is possible to represent similarity between two feature values, for example, by a value (e.g., a reciprocal of a norm) that increases, as the norm of these feature values in a feature value space decreases. Note that, as the norm, any type of a norm (e.g., an L1 norm and an L2 norm) can be used.

However, in a case where the feature value set 104 satisfies a predetermined condition, the determination unit 2020 uses, for the above-described comparison, a part of feature values included in the feature value set 104 (i.e., a partial set of the feature value set 104). Hereinafter, a partial set of the feature value set 104 used for comparison is referred to as a partial feature value set. Likewise, in a case where the retrieval target set 60 satisfies a predetermined condition, the determination unit 2020 uses, for the above-described comparison, a part of feature values included in the retrieval target set 60 (i.e., a partial set of the retrieval target set 60). Hereinafter, a partial set of the retrieval target set 60 to be used for comparison is referred to as a partial retrieval target set. For example, the above-described predetermined condition is that the number of elements in a set is more than a predetermined number.

Herein, a partial feature value set may be generated in advance before the retrieval target set 60 is acquired. For example, when a new feature value is added to the feature value set 104, the retrieval apparatus 2000 determines whether the number of elements in the feature value set 104 is equal to or less than a predetermined number. In a case where the number of elements in the feature value set 104 is not equal to or less than the predetermined number, the retrieval apparatus 2000 generates a partial feature value set, as a set in which one feature value is removed from the feature value set 104. This enables keeping the number of elements in the partial feature value set to be equal to or less than the predetermined number.

In addition to the above, for example, the retrieval apparatus 2000 determines whether the number of elements in the feature value set 104 included in object information 100 is equal to or less than a predetermined number at a time of inserting new object information 100 into the storage region 50. Then, in a case where the number of elements in the feature value set 104 is more than the predetermined number, the retrieval apparatus 2000 generates a partial feature value set constituted of a part of feature values included in the feature value set 104. It is assumed that the number of elements in the partial feature value set is equal to or less than the above-described predetermined number.

Information representing a partial feature value set may be generated separately from the feature value set 104, or may be generated by including, in the feature value set 104, information relating to the partial feature value set. In the former case, a partial feature value set generated from the feature value set 104 is included in object information 100 having the feature value set 104. In the latter case, for example, a flag indicating whether a feature value included in the feature value set 104 is included in the partial feature value set is set in association with each of feature values. By referring to the flag, the determination unit 2020 can recognize a feature value included in the partial feature value set.

Hereinafter, a method of generating a partial feature value set from a feature value set 104 is described. Note that, it is assumed that an upper limit (the above-described predetermined number) of the number of elements in a partial retrieval target set is determined in advance. The same method can also be applied to a method of generating a partial retrieval target set from a retrieval target set 60.

<<First Method>>

For example, the determination unit 2020 preferentially includes, in a partial feature value set, a feature value, as the feature value approaches a reference position (reference feature value) of the feature value set 104 in a feature value space. For example, the reference position is a center position of the feature value set 104 (average of feature values included in the feature value set 104).

For example, the determination unit 2020 computes a distance to a feature value (such as an average of feature values included in the feature value set 104) representing a reference position regarding each of feature value sets 104 included in the feature value set 104. Then, the determination unit 2020 preferentially includes, in a partial retrieval target set, a feature value, as the distance of the feature value decreases. Specifically, in a case where the number of elements in a partial feature value set is n, the determination unit 2020 determines n feature values in the ascending order of the computed distance, and generates a partial feature value set constituted of these n feature values.

In addition to the above, for example, in a case where a reference position is a center of a feature value space, it is possible to approximately and preferentially include, in a partial feature value set, a feature value close to the center by generating a partial feature value set as described below. First, the determination unit 2020 computes similarity regarding each of all patterns of pairs of feature values included in the feature value set 104, and sorts out the pairs in an order of similarity. Then, a high score is given to each of the pairs, as the similarity increases. For example, in a case where the number of pairs included in the feature value set 104 is m, a score (m-i+1) is given to the i-th pair.

Further, the determination unit 2020 computes, regarding each of feature values, a total value of scores of all pairs including the feature value. Then, the determination unit 2020 preferentially includes, in the partial feature value set, a feature value having a large total value of the scores. For example, in a case where the number of elements in a partial feature value set is n, the determination unit 2020 generates a partial feature value set constituted of n feature values in the descending order of a total value of scores.

<<Second Method>>

In this method, as a premise, appropriateness of a feature value is associated with each of the feature values. Therefore, the feature value set 104 and the retrieval target set 60 include information in which a feature value and appropriateness are associated with each other.

Appropriateness of a feature value indicates how much the feature value is appropriate as information representing a feature of an object. For example, it is assumed that an object is a person, and a feature value is an image feature of a face of the person. In this case, the more the face represented by the feature value faces a front side of a camera, it can be said that the feature value appropriately represents a feature of the face. In view of the above, for example, a value representing a degree by which a face faces a front side of a camera is used as appropriateness of a feature value. In this case, for example, it is possible to determine appropriateness in such a way that appropriateness increases, as an angle decreases based on a premise that an angle of a face when the face faces the front side of the camera is handled as 0 degree, and an angle of the face when the face faces a direction opposite to the camera is handled as 180 degrees.

In addition to the above, for example, it is possible to handle a size of an image of an object, as appropriateness of a feature value. This is because, as a size of an image of an object increases, it is appropriate to extract a feature value of the object. Note that, in a case where a feature value is extracted regarding a part of an object, a size of an image region of a part from which the feature value is extracted is used as appropriateness. For example, in a case where a feature value of a face is extracted, a size of an image region of the face is used as appropriateness.

Appropriateness associated with a feature value is computed at a time of computing a feature value. In a case where a feature value is an image feature, for example, at a time of extracting a feature value from a captured image, appropriateness of the feature value is computed by analyzing the captured image (e.g., analyzing an angle of a face).

The determination unit 2020 preferentially includes, in a partial feature value set, a feature value, as associated appropriateness increases among feature values included in the feature value set 104. For example, in a case where the number of elements in a partial feature value set is n, the determination unit 2020 determines n feature values in the descending order of associated accuracy, and generates a partial feature value set constituted of these n feature values.

<<Third Method>>

In this method, as a premise, a state parameter being data representing a state of an object at a time of acquiring a feature value is associated with each of the feature values. The feature value set 104 and the retrieval target set 60 include information in which a feature value and a state parameter are associated with each other.

Various state parameters can be adopted as a state parameter. For example, a state parameter is a degree (angle from a front side) by which an object faces a front side, clothes of a person, a facial expression of a person, a pose of a person, surrounding brightness, a place, a time, and the like. As a state parameter representing clothes of a person, for example, a color of clothes, a type of clothes, and the like can be adopted. A color of clothes can be represented by a value such as an RGB value that uniquely determines the color, or can be represented by a class such as a blue system or a red system. A type of clothes can be represented, for example, by a class such as a jacket, trousers, or a skirt. A facial expression of a person can be represented, for example, by a class such as laughing, crying, being angry, or being worried. A pose of a person can be represented, for example, by a coordinate within a captured image of a specific part (such as a hand, a leg, or a head) of the person. In addition to the above, for example, a pose of a person can be represented by a class such as standing, sitting, or lying. Note that, an existing technique can be used as a technique for computing a value of the above-described various state parameters regarding a person included in a captured image.

The determination unit 2020 determines a feature value included in a partial feature value set in such a way that a distribution of state parameters included in the feature value set 104 increases. For example, after including all elements included in the feature value set 104 in a partial feature value set, the determination unit 2020 removes a feature value one by one from the partial feature value set by the below-described method until the number of elements in the partial feature value set becomes equal to a predetermined number.

First, the determination unit 2020 sorts out pairs of state parameters and feature values included in a partial feature value set in the descending order of the state parameter. Next, the determination unit 2020 computes a difference between these pairs of adjacent state parameters regarding each of the pairs. The determination unit 2020 determines a pair (hereinafter, a smallest pair) of state parameters in which the difference is smallest. A feature value to be removed from the partial feature value set is a feature value associated with either one of the state parameters included in the smallest pair. Hereinafter, state parameters included in a smallest pair are respectively referred to as a candidate 1 and a candidate 2.

The determination unit 2020 computes a difference between pairs of adjacent state parameters regarding each of a set in which a feature value associated with the candidate 1 is removed from the partial feature value set, and a set in which a feature value associated with the candidate 2 is removed from the partial feature value set. Then, the determination unit 2020 sets, as a new partial feature value set, a set in which a smallest value of the difference is larger between the above-described two sets. Increasing a smallest value of a difference large means increasing a smallest distance between state parameters, therefore, by the above-described setting, it is conceived that a distribution of state parameters can be widened.

For example, it is assumed that a smallest value of a difference computed regarding a set in which a feature value associated with the candidate 1 is removed is larger than a smallest value of a difference computed regarding a set in which a feature value associated with the candidate 2 is removed. In this case, the set in which the feature value associated with the candidate 1 is removed becomes a new partial feature value set. In other words, the feature value associated with the candidate 1 is removed from the partial feature value set.

A method of generating a partial feature value set based on a state parameter is not limited to the above-described method. For example, dispersion may be computed regarding a state parameter, and a partial feature value set may be determined in such a way that the dispersion increases. Specifically, the determination unit 2020 generates all patterns regarding a set in which one feature value is removed from a partial feature value set. For example, in a case where x feature values are included in a partial feature value set, x sets are generated. The determination unit 2020 computes dispersion of state parameters regarding each of these x sets. Then, the determination unit 2020 sets, as a new partial feature value set, a set in which the dispersion is maximum. The determination unit 2020 repeats processing of removing one element from a partial feature value set as described above until the number of elements in the partial feature value set becomes equal to a predetermined number.

<< >Other Methods>>

For example, the determination unit 2020 may generate a partial feature value set by extracting a feature value from the feature value set 104 at random. For example, in a case where the number of elements in a partial feature value set is set to n, the determination unit 2020 extracts n feature values from the feature value set 104 at random, and generates a partial feature value set constituted of the extracted feature values.

In addition to the above, for example, the determination unit 2020 may sort out feature values included in the feature value set 104 in an order of a generation time of the feature value (a generation time of an image or the like from which the feature value is extracted), and generate a partial feature value set by extracting the sorted feature values at a regular interval (e.g., extracting every other feature value).

<Output by Output Unit 2040: S106>

The output unit 2040 outputs output information relating to object information 100 (object information 100 having the feature value set 104 similar to the retrieval target set 60) determined by the determination unit 2020 (S106). As output information, it is possible to include any information relating to object information 100 determined by the output unit 2040. For example, the output unit 2040 outputs the determined object information 100 itself. In addition to the above, for example, the output unit 2040 outputs an object identifier 104 indicated in the determined object information 100.

In addition to the above, for example, object information 100 may include various pieces of information representing an object, and these various pieces of information may be included in output information. For example, in a case where an object is a person, any attribute information such as a name, age, gender of the person is included in object information 100. In this case, the output unit 2040 outputs these attributes by including in output information.

Note that, a type of information to be included in output information may be determined in advance, or may be designated at a time of acquiring the retrieval target set 60. In the latter case, for example, a retrieval query, in which a type of information (type of an attribute) that a user of the retrieval apparatus 2000 desires to know regarding the retrieval target set 60 and an object, is input by the user to the retrieval apparatus 2000. The output unit 2040 includes, in output information, information of the type indicated in the retrieval query among information indicated in the object information 100 determined by the determination unit 2020. Note that, an existing technique can be used as a technique for designating information that a user desires to know by a retrieval query.

A way of outputting output information is optional. For example, the output unit 2040 causes a display apparatus connected to the retrieval apparatus 2000 to display output information. In addition to the above, for example, the output unit 2040 stores output information in a predetermined storage apparatus. In addition to the above, for example, in a case where the retrieval apparatus 2000 receives the retrieval target set 60 transmitted from another apparatus, the output unit 2040 transmits output information to the another apparatus (response to a retrieval query).

Preferably, output information transmitted to another apparatus may be displayed on a display apparatus provided in the another apparatus. Note that, an existing technique can be used as a technique for causing a display apparatus provided in another apparatus to display information transmitted to the another apparatus.

In the foregoing, example embodiments according to the present invention have been described with reference to the drawings, however, these are examples of the present invention, and combination of the above-described example embodiments, or various configurations other than the above can also be adopted.

A part or all of the above-described example embodiments may also be described as the following supplementary notes, but is not limited to the following.

1. A retrieval apparatus being accessible to a storage region in which a plurality of pieces of object information including a feature value set being a set of a plurality of feature values acquired regarding an object are stored, the retrieval apparatus comprising:

a determination unit that acquires a feature value set being a retrieval target, and determines object information indicating a feature value set similar to a feature value set being the retrieval target from among the plurality of pieces of object information by comparing the acquired feature value set with a feature value set indicated in the object information; and an output unit that outputs output information relating to the determined object information, wherein, in a case where the feature value set satisfies a predetermined condition, the determination unit performs comparison between the feature value set and another feature value set by using a part of feature values within the feature value set.

2. The retrieval apparatus according to supplementary note 1, wherein the determination unit preferentially uses a feature value included in the feature value set, for comparison with the another feature value set, as the feature value approaches a reference position of the feature value set in a feature value space.

3. The retrieval apparatus according to supplementary note 2, wherein the determination unit
computes similarity between feature values regarding each of all pairs of feature values included in the feature value set,
allocates a high score to each of the pairs, as similarity increases, and
preferentially uses a feature value, for comparison with the another feature value set, as a total value of scores allocated to each of pairs including the feature value increases.

4. The retrieval apparatus according to supplementary note 1, wherein the feature value set includes appropriateness of the feature value in association with each of the feature values, and the determination unit preferentially uses a feature value, for comparison with the another feature value set, as associated appropriateness increases among feature values included in the feature value set.

5. The retrieval apparatus according to supplementary note 4, wherein the feature value includes a feature of a face of a person extracted from an image, and appropriateness of the feature value is determined based on an angle of a face of a person having the feature value in an image from which the feature value is extracted.

6. The retrieval apparatus according to supplementary note 1, wherein the feature value set includes a parameter relating to a state of an object represented by the feature value in association with each of the feature values, and the determination unit extracts the plurality of feature values from the feature value set in such a way that dispersion of the parameter included in the feature value set increases, and uses the extracted feature value for comparison with the another feature value set.

7. A control method to be executed by a computer, the computer being accessible to a storage region in which a plurality of pieces of object information including a feature value set being a set of a plurality of feature values acquired regarding an object are stored.

The control method including:

a determination step of acquiring a feature value set being a retrieval target, and determining object information indicating a feature value set similar to a feature value set being the retrieval target from among the plurality of pieces of object information by comparing the acquired feature value set with a feature value set indicated in the object information;

an output step of outputting output information relating to the determined object information; and, in the determination step, in a case where the feature value set satisfies a predetermined condition, performing comparison between the feature value set and another feature value set by using a feature value of one step within the feature value set.

8. The control method according to supplementary note 7, further including:

in the determination step, preferentially using a feature value included in the feature value set, for comparison with the another feature value set, as the feature value approaches a reference position of the feature value set in a feature value space.

9. The control method according to supplementary note 8, further including:

in the determination step,
computing similarity between feature values regarding each of all pairs of feature values included in the feature value set;
allocating a high score to each of the pairs, as similarity increases; and
preferentially using a feature value, for comparison with the another feature value set, as a total value of scores allocated to each of pairs including the feature value increases.

10. The control method according to supplementary note 7, wherein the feature value set includes appropriateness of the feature value in association with each of the feature values, and the control method further including, in the determination step, preferentially using a feature value, for comparison with the another feature value set, as associated appropriateness increases among feature values included in the feature value set.

11. The control method according to supplementary note 10, wherein the feature value includes a feature of a face of a person extracted from an image, and appropriateness of the feature value is determined based on an angle of a face of a person having the feature value in an image from which the feature value is extracted.

12. The control method according to supplementary note 7, wherein
the feature value set includes a parameter relating to a state of an object represented by the feature value in association with each of the feature values, and
the control method further including,
in the determination step, extracting the plurality of feature values from the feature value set in such a way that dispersion of the parameter included in the feature value set increases, and using the extracted feature value for comparison with the another feature value set.

13. A program causing a computer to execute the control method according to any one of supplementary notes 7 to 12.

This application is based upon and claims the benefit of priority from Japanese patent application No. 2019-098793, filed on May 27, 2019, the disclosure of which is incorporated herein in its entirety by reference.

REFERENCE SIGNS LIST

20 Feature value set
50 Storage region
60 Retrieval target set
100 Object information
102 Object identifier
104 Feature value set
1000 Computer
1020 Bus
1040 Processor
1060 Memory
1080 Storage device
1100 Input/output interface
1120 Network interface
2000 Retrieval apparatus
2020 Determination unit
2040 Output unit

What is claimed is:

1. A retrieval apparatus having access to a storage region in which a plurality of pieces of object information are stored, the pieces of object information including a feature value set, the feature value set being a set of a plurality of feature values acquired regarding an object, the retrieval apparatus comprising:
at least one memory storing one or more instructions; and
at least one processor configured to execute the one or more instructions to:
acquire a first feature value set as a retrieval target;
determine object information indicating a second feature value set similar to the first feature value set from among the plurality of pieces of object information by comparing the first feature value set with the second feature value set; and
output output information relating to the determined object information,
wherein a predetermined condition comprises a determination that a number of elements in a feature value set is more than a predetermined number, and
wherein, in a case where one of the feature value sets satisfies the predetermined condition, the at least one processor is further configured to execute the one or more instructions to:
extract a part of feature values from the feature value set, a number of elements in the part of feature values being equal to or less than the predetermined number; and
perform the comparison between the feature value set and another feature value set by using the part of feature values within the feature value set.

2. The retrieval apparatus according to claim 1, wherein the processor is further configured to execute the one or more instructions to preferentially use a feature value included in the feature value set, for comparison with the another feature value set, as the feature value approaches a reference position of the feature value set in a feature value space.

3. The retrieval apparatus according to claim 2, wherein the processor is further configured to execute the one or more instructions to:
compute similarity between feature values regarding each of all pairs of feature values included in the feature value set,
allocate a high score to each of the pairs, as similarity increases, and
preferentially use a feature value, for comparison with the another feature value set, as a total value of scores allocated to each of pairs including the feature value increases.

4. The retrieval apparatus according to claim 1,
wherein the feature value set includes appropriateness of the feature value in association with each of the feature values, and
wherein the processor is further configured to execute the one or more instructions to preferentially use a feature value, for comparison with the another feature value set, as associated appropriateness increases among feature values included in the feature value set.

5. The retrieval apparatus according to claim 4,
wherein the feature value includes a feature of a face of a person extracted from an image, and
wherein appropriateness of the feature value is determined based on an angle of a face of a person having the feature value in an image from which the feature value is extracted.

6. The retrieval apparatus according to claim 1,
wherein the feature value set includes a parameter relating to a state of an object represented by the feature value in association with each of the feature values, and
wherein the processor is further configured to execute the one or more instructions to extract the plurality of feature values from the feature value set in such a way that dispersion of the parameter included in the feature value set increases, and use the extracted feature value for comparison with the another feature value set.

7. A control method to be executed by a computer, the computer having access to a storage region in which a plurality of pieces of object information are stored, the pieces of object information including a feature value set, the feature value set being a set of a plurality of feature values acquired regarding an object, the control method comprising:
acquiring a first feature value set as a retrieval target;
determining object information indicating a second feature value set similar to the first feature value set from among the plurality of pieces of object information by comparing the first feature value set with the second feature value set; and
outputting output information relating to the determined object information;

wherein a predetermined condition comprises a determination that a number of elements in a feature value set is more than a predetermined number, and wherein the determining of the object information comprises, in a case where one of the feature value sets satisfies the predetermined condition:

extracting a part of feature values from the feature value set, a number of elements in the part of feature values being equal to or less than the predetermined number; and performing the comparison between the feature value set and another feature value set by using the part of feature values within the feature value set.

8. A non-transitory storage medium storing a program causing a computer having access to a storage region in which a plurality of pieces of object information are stored, the pieces of object information including a feature value set, the feature value set being a set of a plurality of feature values acquired regarding an object, to:

acquire a first feature value set as a retrieval target;

determine object information indicating a second feature value set similar to the first feature value set from among the plurality of pieces of object information by comparing the first feature value set with the second feature value set; and output output information relating to the determined object information, wherein a predetermined condition comprises a determination that a number of elements in a feature value set is more than a predetermined number, and wherein, in a case where one of the feature value sets satisfies the predetermined condition, the computer is further caused to:

extract a part of feature values from the feature value set, a number of elements in the part of feature values being equal to or less than the predetermined number; and perform the comparison between the feature value set and another feature value set by using the part of feature values within the feature value set.

* * * * *